Nov. 1, 1932.  L. P. LEMAIRE  1,886,204

PRISM CARRIER FOR CAMERAS AND THE LIKE OPTIC APPARATUS

Filed April 24, 1931

L. P. Lemaire
INVENTOR

By: Marks & Clerk
Attys.

Patented Nov. 1, 1932

1,886,204

UNITED STATES PATENT OFFICE

LOUIS PAUL LEMAIRE, OF LA GARENNE, FRANCE

PRISM CARRIER FOR CAMERAS AND THE LIKE OPTIC APPARATUS

Application filed April 24, 1931, Serial No. 532,647, and in France May 8, 1930.

There exist numerous optic apparatuses and chiefly photographic apparatuses, comprising prisms which must be secured in a suitable position with reference to the other optic parts. None of the devices used heretofore for the fixation of these prisms has given entire satisfaction.

My invention has for its object an arrangement for mounting prisms on cameras and the like apparatuses which is particularly simple and practical and shows moreover important technical advantages over the devices now in use.

According to the present invention, the prism is mounted on a casing adapted to rotate round the optic axis of the apparatus and which in the case of application to a photographic apparatus, may be carried by the shutter casing. This rotary casing comprises a flange against which one of the sides of the prism bears; this prism is on the other hand mounted in a shoe bearing against its hypotenuse surface and provided with lateral projections adapted to prevent any lateral displacement of the prism, this shoe being secured through screws against a sloping part of the casing whereby the pressure exerted on the hypotenuse of the prism by the shoe applies the last surface of the prism which is not carried by the casing itself against the surface of the casing.

A form of execution of the invention adapted to a photographic apparatus comprising a shutter casing is shown by way of example in the accompanying drawing wherein.

Figure 1:
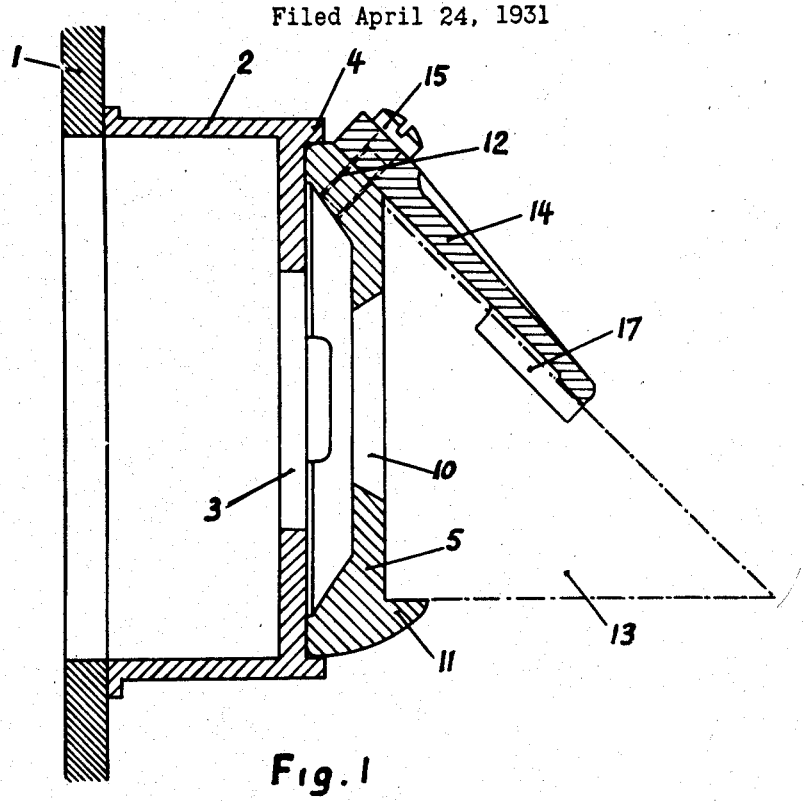
Fig. 1 is a cross-sectional view of the device.
Figure 2:
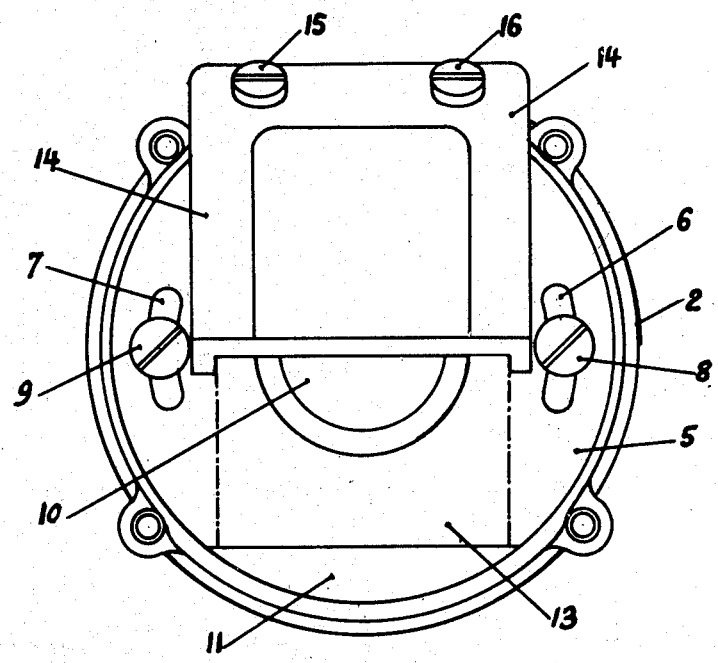
Fig. 2 is a front view thereof.

To the body 1 of the photographic apparatus is secured the shutter casing 2 carrying the optic system (not shown). This casing is provided with a circular opening 3 the centre of which is on the axis of the apparatus and it shows on its outside a flange 4 which forms thus a sort of dished part. In this dished part is housed the second or prism casing 5 which projects beyond the flange 4 and may rotate inside the dished part round the optic axis of the camera. To this purpose the casing 5 is provided with two arcuate slots 6 and 7 the centre of which is on the optic axis, in which slots the screws 8 and 9 carried by the casing 2 are engaged.

The casing 5 which is provided with a central aperture 10 shows at its lower end a flat faced projection or shoulder 11 and diametrically opposite the latter a sloping or bevelled surface 12.

The prism 13 bears against the casing 5 and the shoulder 11 thereon and is on the other hand held in a shoe 14 which bears against its hypotenuse surface and which is held down by screws 15 and 16 against the sloping plane 12. This shoe 14 has on its sides flanges such as 17 (Fig. 1) which prevent any lateral displacement of the prism 13 and center it with reference to the optic axis.

The working is as follows: the screws 8 and 9 being removed, the casing 5 is set in place and the screws 8 and 9 are engaged without being screwed home. The prism 13 engaged in its shoe is then set in place, one of its surfaces resting on the shoulder 11 after which the screws 15 and 16 are screwed down the oblique pressure of which causes the other surface of the solid angle to bear against the annular bearing surface of the casing 5. The arrangement comprising the casing 5, shoe 14 and prism 13 is then caused to rotate in the dished part formed by the casing 2 so as to properly adjust the position of the prism with reference to the other optic elements. It is then only necessary to screw down the screws 8 and 9 in order to lock the prism and carrier thereof in their position thus obtained.

It is apparent that this type of carrier shows the several following advantages:

(a) From an economical standpoint all the parts are of a simple construction and may be executed in series in a molten or cast material such as bakelite.

(b) From a practical standpoint, the prism may be easily and rapidly dismantled for it to be cleaned and its adjustment is effected with the greatest ease.

(c) Lastly from a technical standpoint, the expansion of the prism may be effected freely which is of a capital importance for obtaining a good picture. This last advantage is all the more important when the prism is larger. Moreover it will be noticed that the weight of this improved type of carrier is far smaller than that of all the carriers known heretofore.

What I claim is:

1. A prism carrier for cameras and the like optic apparatuses comprising an apertured support for carrying the prism through a face adjacent its straight solid angle, said support being adapted to rotate freely round the optic axis of the apparatus and provided with a bevelled surface, a projection raised on the support diametrically opposite the bevelled surface and adapted to serve as an abutment for the prism, a shoe adapted to bear on the hypotenuse face of the prism and to press said prism against the support and projection thereon and means for securing the shoe to the bevelled surface of the support.

2. In a prism carrier as claimed in claim 1, the provision of flanges raised on either side of the shoe the spacing of which is substantially equal to the width of the prism and adapted to bear against the corresponding side faces of the prism.

In testimony whereof I have affixed my signature.

LOUIS PAUL LEMAIRE.